US008065737B1

(12) United States Patent
Kulkarni et al.

(10) Patent No.: US 8,065,737 B1
(45) Date of Patent: Nov. 22, 2011

(54) VIRUS SCANNING FOR BLOCK-LEVEL DISTRIBUTED APPLICATION MANAGEMENT

(75) Inventors: Pradip Kulkarni, Pune (IN); Mukul Kumar, Pune (IN); Adhir Potdar, Maharahstra (IN); Richard Au, Woodside, CA (US); Tung Nguyen, Cupertino, CA (US)

(73) Assignee: Panta Systems, Inc., Cupertino, CA (US)

( * ) Notice: Subject to any disclaimer, the term of this patent is extended or adjusted under 35 U.S.C. 154(b) by 988 days.

(21) Appl. No.: 11/712,728

(22) Filed: Feb. 28, 2007

Related U.S. Application Data

(63) Continuation-in-part of application No. 11/395,816, filed on Mar. 30, 2006, now Pat. No. 7,721,282.

(51) Int. Cl.
*G06F 11/00* (2006.01)
(52) U.S. Cl. ........................................................ 726/24
(58) Field of Classification Search .................... 726/24, 726/22; 713/188
See application file for complete search history.

(56) References Cited

U.S. PATENT DOCUMENTS

| 5,175,852 | A | 12/1992 | Johnson et al. |
| 6,101,576 | A | 8/2000 | Kobayashi et al. |
| 6,502,238 | B1 * | 12/2002 | Pavan et al. .................. 717/149 |
| 6,745,192 | B1 * | 6/2004 | Libenzi ................................ 1/1 |
| 6,751,658 | B1 | 6/2004 | Haun et al. |
| 7,269,664 | B2 | 9/2007 | Hutsch et al. |
| 7,475,274 | B2 * | 1/2009 | Davidson .......................... 714/4 |
| 7,549,055 | B2 * | 6/2009 | Zimmer et al. ............... 713/188 |
| 2002/0083120 | A1 | 6/2002 | Soltis |
| 2003/0126242 | A1 * | 7/2003 | Chang ........................... 709/222 |
| 2005/0131962 | A1 | 6/2005 | Deshpande |

OTHER PUBLICATIONS

Sivathanu et al., Ensuring Data Integrity in Storage: Techniques and Applications, Nov. 2005, StorageSS '05.*

* cited by examiner

*Primary Examiner* — Vivek Srivastava
*Assistant Examiner* — Samuel Ambaye (57) ABSTRACT

Described herein is technology for, among other things virus scanning for block-level distributed application management. The technology involves storing blocks of a root image on a first storage unit and storing blocks of leaf images on respective second storage units. The leaf images include additional data blocks not previously contained in the root image and changes made by respective compute nodes to the blocks of the root image. The technology includes receiving a notification from one of the compute nodes that the root image has been scanned for viruses and providing the notification to other compute nodes.

20 Claims, 4 Drawing Sheets

VIRUS SCANNING FOR BLOCK-LEVEL DISTRIBUTED APPLICATION MANAGEMENT

CLAIM OF PRIORITY UNDER 35 U.S.C. §120

The present Application for Patent is a continuation-in-part of patent Ser. No. 11/395,816 entitled "BLOCK-LEVEL I/O SUBSYSTEM FOR DISTRIBUTED APPLICATION ENVIRONMENT MANGEMENT" filed Mar. 30, 2006, now U.S. Pat. No. 7,721,282, and assigned to the assignee hereof and hereby expressly incorporated by reference herein.

REFERENCE TO CO-PENDING APPLICATIONS FOR PATENT

The present Application for Patent is related to the following co-pending U.S. Patent Application:
"ROOT IMAGE CACHING AND INDEXING FOR BLOCK-LEVEL DISTRIBUTED APPLICATION MANAGEMENT" by Kulkarni et al, having Ser. No. 11/709,477, filed concurrently herewith, assigned to the assignee hereof, and expressly incorporated by reference herein.

BACKGROUND

1. Field of the Invention

Embodiments of the present invention relate to the field of networked computing. Specifically, embodiments of the present invention relate to distributed application environment deployment in a multi-computer system.

2. Background

Over the years, as the internet has expanded and computers have multiplied, the need for clustered computing such as High Performance Computing (HPC) has increased. Clustered computing involves multiple compute nodes, usually a server grid, that work together to achieve a common task. For example, several (typically hundreds of) compute nodes may be clustered together to share the load of serving a high-traffic website. In large-scale systems such as this, a trend in software deployment is to centralize data management on a globally accessible file system with stateless computing nodes. A common example of this is Operating System (OS) software image management, where the compute nodes are activated with the distributed application environment by either diskless booting protocols or remote software installation to local storage. Under this architecture, a boot image is required for each compute node in the cluster. The boot image necessarily contains the kernel; it may additionally contain the application software that is intended to be run on the compute node.

The primary concern in clustered computing is low cluster bring-up time. The software that provides the boot images for the cluster typically stores a master boot image. It may then either pre-create clones of this master image for each such server, or it may create them "on the fly."

Creating a boot image on the fly involves copying the entire contents of the master image, which are typically in the range of 5-15 GB. Even with a significant amount of bandwidth by today's standards, this method will result in a large bring-up time.

Pre-creating a boot image for each server is advantageous from the point of view of cluster bring-up time. However, since one often does not know in advance how many servers will ever be booted, this scheme may result in wasted disk space.

Regardless of which of the preceding methods is used, both suffer from the same major problem—updating the boot image(s) for the cluster is cumbersome, as it means updating a number of copies of the boot image.

Additionally, once some compute nodes have booted, they will often engage in redundant activities with respect to each other. For example, assume that a cluster involves 20 compute nodes is each running the same operating system and using substantially similar hardware. Between the 20 compute nodes, there will be a great deal of commonality between their boot images (e.g., common operating system files, common drivers, common library files, common applications, etc.). Moreover, when each of the 20 compute nodes run virus scans (e.g., weekly) on their images, a large portion of the data scanned will be the same from one compute node to the next. Thus, to the extent that there is redundancy in the operations of the compute nodes (such as virus scanning), CPU resources, disk space, and data bus bandwidth are wasted.

A Branching Store File System, as described in patent application Ser. No. 11/026,622 entitled "BRANCING STORE FILE SYSTEM" filed Dec. 30, 2004, pending, and assigned to the assignee hereof, was developed as a solution to the boot image update problem. In a branching store file system, a read-only base image (or "root" image) of the application environment is created. The root image is accessible by all compute nodes in the cluster. Changes made by a compute node to the root image are stored in a "leaf" image unique to that compute node. A filter operates between the compute nodes and the file system(s), which merges the changes recorded on the leaf images with the root image and delivers the result to the appropriate compute node. From the point of view of the compute node, it is running its own unique and cohesive instance of the application environment. While this system allows for creation of boot images on the fly without severely diminishing bring-up time, a separate version of the system must be created for each unique operating system. Thus, migrating a computing cluster from one operating system to another is much more complicated than simply installing a new root image containing the new OS.

SUMMARY

Described herein is technology for, among other things virus scanning for block-level distributed application management. The technology involves storing blocks of a root image on a first storage unit and storing blocks of leaf images on respective second storage units. The leaf images include additional data blocks not previously contained in the root image and changes made by respective compute nodes to the blocks of the root image. The technology includes receiving a notification from one of the compute nodes that the root image has been scanned for viruses and providing the notification to other compute nodes.

Thus, because of the commonality of the root image, certain operations performed on the root image (e.g., virus scanning) only need to be performed once by one compute node. Thereafter, the results of that operation can be shared with the other compute nodes in the cluster, thus saving the other compute nodes valuable time and resources.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Briefly stated, described herein is technology for, among other things virus scanning for block-level distributed application management. The technology involves storing blocks of a root image on a first storage unit and storing blocks of leaf images on respective second storage units. The leaf images include additional data blocks not previously contained in the root image and changes made by respective compute nodes to the blocks of the root image. The technology includes scanning blocks of the root image for viruses. Once the root image has been scanned and viruses, if any, have been removed, the root image does not need to be scanned again because its contents are not changed by the compute nodes.

Example Compute Node Operating Environment

Figure 1:
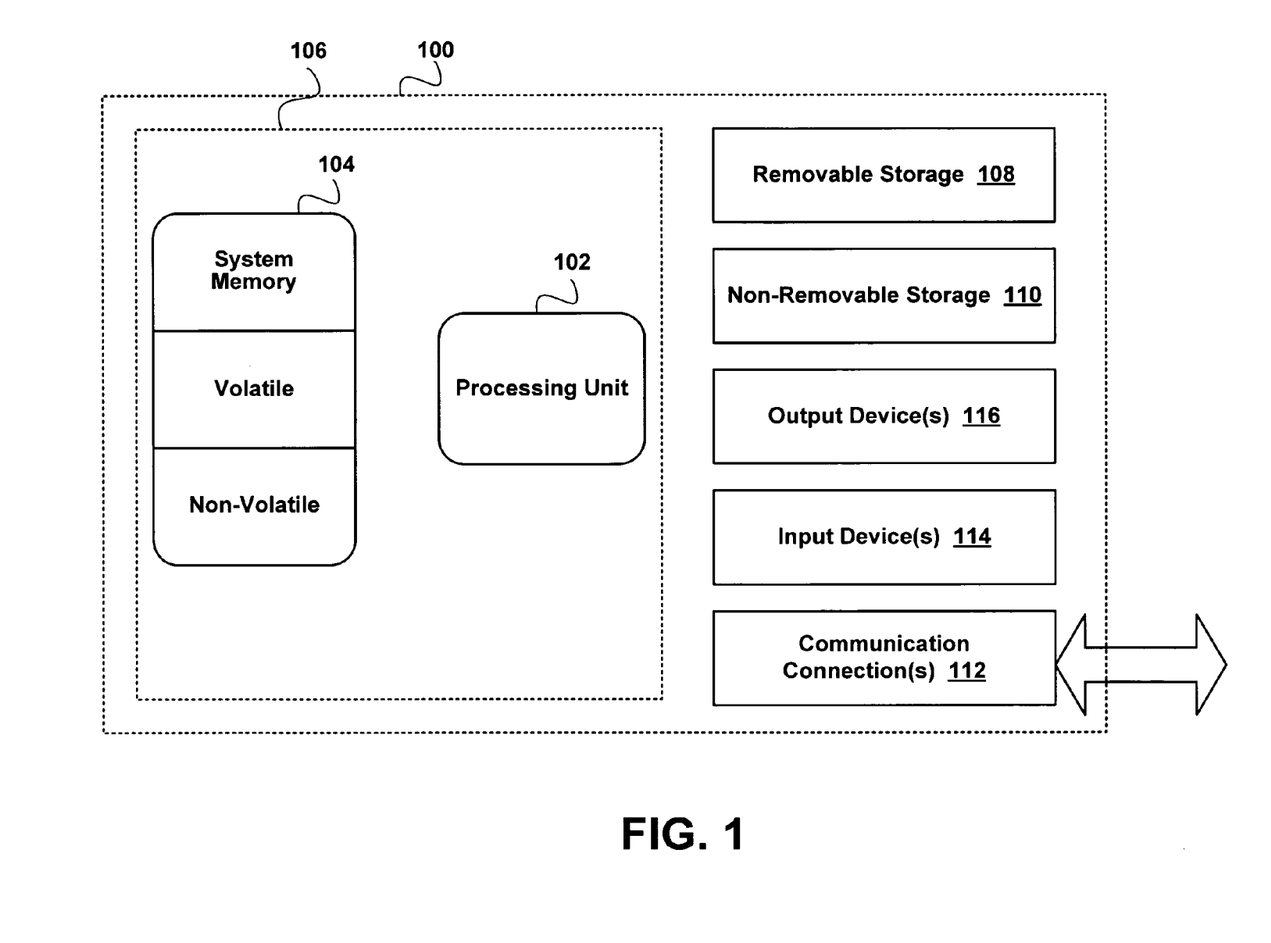
FIG. 1 is a diagram of a system for distributing an application environment, in accordance with an embodiment of the present invention.

With reference to FIG. 1, an example system for implementing embodiments includes a general purpose computing system environment, such as compute node 100. In its most basic configuration, compute node 100 typically includes at least one processing unit 102 and memory 104. Depending on the exact configuration and type of compute node, memory 104 may be volatile (such as RAM), non-volatile (such as ROM, flash memory, etc.) or some combination of the two. This most basic configuration is illustrated in FIG. 1 by dashed line 105. Additionally, compute node 100 may also have additional features/functionality. For example, compute node 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and nonremovable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by compute node 100. Any such computer storage media may be part of compute node 100.

Compute node 100 may also contain communications connection(s) 112 that allow it to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Compute node 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Example Systems

Figure 2:
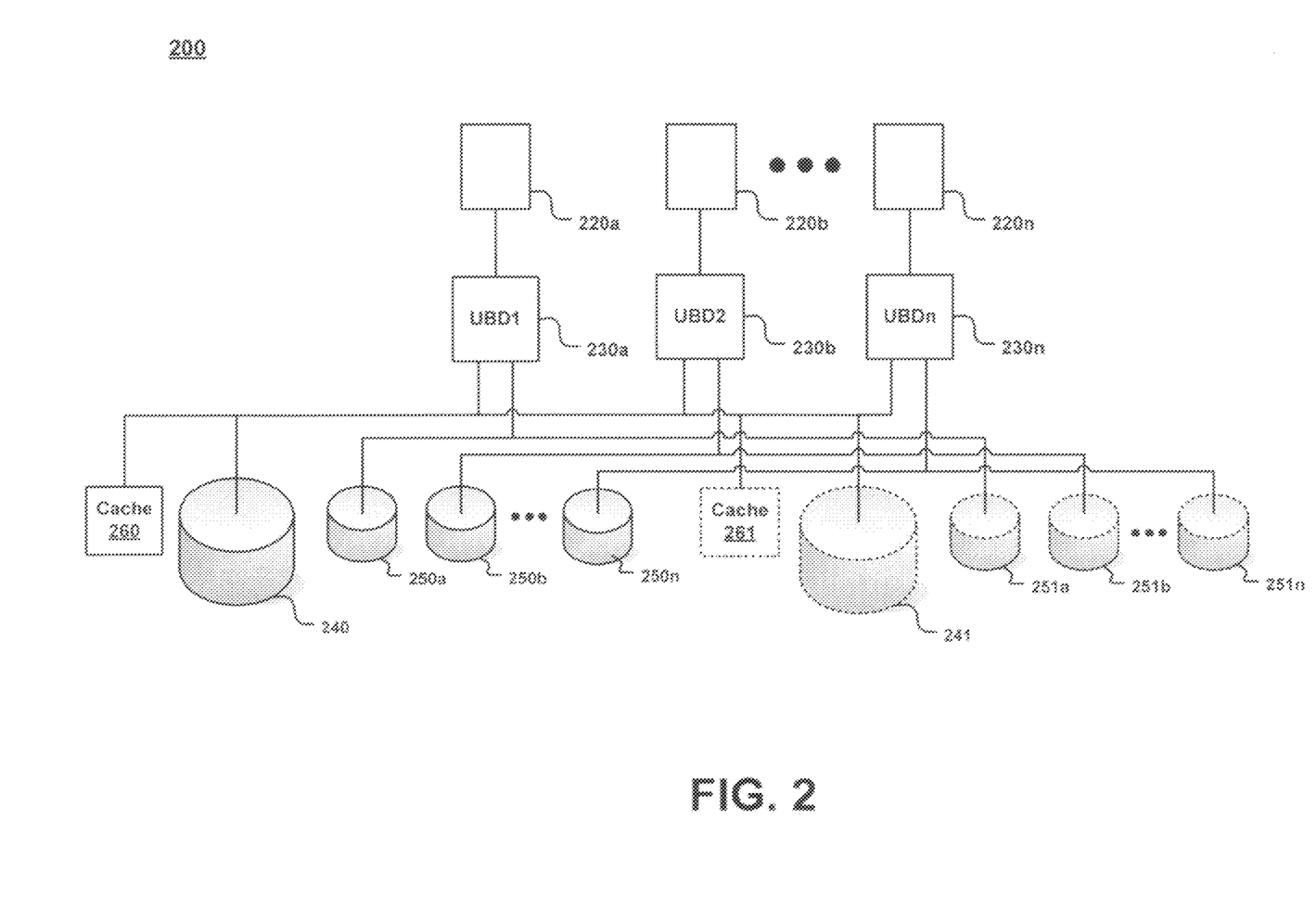
FIG. 2 is a diagram of a system for virus scanning in a block-level distributed application environment, in accordance with various embodiments of the present invention.

FIG. 2 is a diagram of a system 200 for virus scanning in a block-level distributed application environment, in accordance with various embodiments of the present invention. In one embodiment, system 200 is implemented in a multi-computer system, such as an HPC cluster. In one embodiment, the application environment includes an operating system. In other embodiments, the application environment may contain other applications. System 200 has a number of compute nodes 220a-n coupled to a first storage unit 240 and a corresponding second storage unit 250a-n though a corresponding union block device (UBD) 230a-n. To the compute nodes 220a-n, it appears that they have access to their own version of a distributed application environment. However, a separate and complete boot image is not created and stored for each compute node 220a-n.

System 200 has a first storage unit 240 for storing blocks of a root image of an application environment. The root image contains data initially common to the compute nodes 220a-n. The root image is not changed by compute nodes 220a-n. For example, in one embodiment, compute nodes 220a-n have read-only access to the first storage unit 240.

Moreover, each compute node 220a-n has a corresponding second storage unit 250a-n for storing a leaf image. The first storage unit 240 and second storage units 250a-n may each be contained on separate physical storage devices, on separate logical spaces on the same storage device, or any combination thereof. Regardless, the first storage unit 240 and the second storage units 250a-n may be contained within a single storage appliance. The leaf image may contain blocks of new data, blocks of changed data, or other blocks of data unique to the individual compute node. The leaf image may also contain a block modification log. In other words, a leaf image will describe the changes made by the respective compute node 220a-n to its instance of the application environment. Thus, when a compute node (e.g., node 220a) makes changes involving the root image, modifications are made to that compute node's leaf image (e.g., leaf image stored on second storage device 250a). With respect to changes to the root image, only the specific blocks that are changed are stored in the leaf image. For example, a particular file on the root image may comprise twenty blocks of data (e.g., blocks 1-20). One compute node (e.g., compute node 220a) desires to make a change to this file which involves a modification of only a few specific blocks of the file (e.g., blocks 4-9). In this example, only the modified blocks (e.g., blocks 4-9) will be stored in the compute node's leaf image (e.g., leaf image stored on second storage device 250a) plus some small overhead.

A compute node 220a-n mounts its instantiation of the application environment via its respective UBD 230a-n. In one embodiment, UBDs 230a-n are effectively low-level drivers that operate as an interface between the first and second storage devices and the file system of each compute node 220a-n. The file system may reside on the server side of the system 200. The file system may also reside on each of the compute nodes 220a-n. Because UBDs 230a-n operate below the file system, they are concerned merely with the blocks of data themselves, rather than files they form. As a result, system 200 is completely file system, and thus operating system, independent.

UBDs 230a-n determine what leaf image (from the appropriate second storage unit 250) is needed for portions of the application environment that their respective compute nodes 220a-n have changed. UBDs 230a-n also locate the portions of the application environment that are not changed by their respective compute nodes 220a-n. These portions may reside in the root image. There may also be intermediate images (not depicted in FIG. 2) comprising versions of the root image from which a compute node's instance of the application environment is derived. Further, UBDs 230a-n create a new leaf image on a respective second storage unit 250a-n when their respective compute nodes 220a-n initially make changes to their instantiations of the application environment. In one embodiment, the UBDs 230a-n obtain the information necessary to create the application environment from a block modification log located in its respective leaf image.

UBDs 230a-n may also modify the leaf image in response to their respective compute node's access to its instance of the application environment. For example, upon receiving a write request from their respective compute nodes for a sector X, the UBDs 230a-n will create an appropriate persistent mapping for sector X and then write sector X onto their respective second storage units 250a-n, where sector X can then be modified. It will be appreciated that the data block being modified may already exist in the leaf image, in which case it does not need to be mapped and copied from the root image before modification.

By providing an application environment to multiple compute nodes via a branching store system, embodiments allow for a more streamlined update/patch procedure. In one embodiment, first storage device 240 may be refreshed with a new operating system patch, thereby automatically refreshing the image for all dependent compute nodes.

Virus Scanning

An embodiment of the present invention involves virus scanning for a plurality of compute nodes in a cluster. In a traditional clustered computing situation, each compute node would independently scan its boot image for viruses. To the extent that each compute node in a cluster has a similar operating environment to the others, virus scanning performed on common data is therefore redundant.

As an added benefit of the architecture 200 depicted in FIG. 2, because the data stored in the root image is by definition common to all the compute nodes 220a-n, one compute node (e.g., compute node 220a) can scan the contents of the root image for viruses and then notify the other compute nodes (e.g., compute nodes 220b-n) that a virus scan of the root image has been completed. Thereafter, the compute nodes 220a-n need only be concerned with scanning their respective leaf images, which are relatively small compared to the root image. Moreover, in embodiments where the first storage unit 240 is read-only, the root image will not have to be re-scanned because the contents of the root image do not change. It is appreciated that the notification to the other compute nodes that the root image has been scanned can be provided in a number of ways. For example, the results may be stored on a shared storage unit (such as, but not limited to, cache 260), the results may provided directly to the other compute nodes, etc. For simplicity, these virus scanning operations will be described as being performed by a compute node in the cluster. However, the initial virus scanning of the root image does not have to be performed by a compute node. For example, the scanning may be performed by a dedicated virus scan host.

In the event that a compute node (e.g., compute node 220a) does detect a virus in the root image, the compute node is operable to "remove" the offending file(s). Because of the nature of system 200 (i.e. the root image is unmodified), data is not removed or deleted in the literal senses of the words. Instead, appropriate modifications to the leaf images are made to reflect the removal of the data so that the compute nodes no longer "see" the data in their boot images as provided by the UBDs 230a-n. Thus, the UBDs 230a-n are also operable to modify the leaf images to reflect the removal of a virus found on root images. In one embodiment, the removal of a virus from the root image is performed entirely at the UBD-level and therefore occurs without direct involvement of the other compute nodes.

In one embodiment, once the virus scan has been performed on the root image, the compute nodes are operable to subsequently scan their individual boot images by simply scanning their leaf images. This results in huge CPU time and resource savings, in addition to bandwidth savings. For example, consider a computing cluster comprising 20 compute nodes that share a 15 GB root image and each average a 1 GB root image. This results in a boot image size of 15-16 GB for each compute node. If each compute node were to individually scan its entire boot image for viruses, this would result in a total of 300-320 GB of scanned data. By contrast, in one embodiment, the root image is only scanned once and then the leaf images are scanned individually. Including the scan of the root image, this results in only 35 GB of scanned data. Thereafter, periodic (e.g., weekly) scans would only involve scanning approximately 20 GB of data because the unmodified root image does not need to be rescanned.

Example Methods

Figure 3:
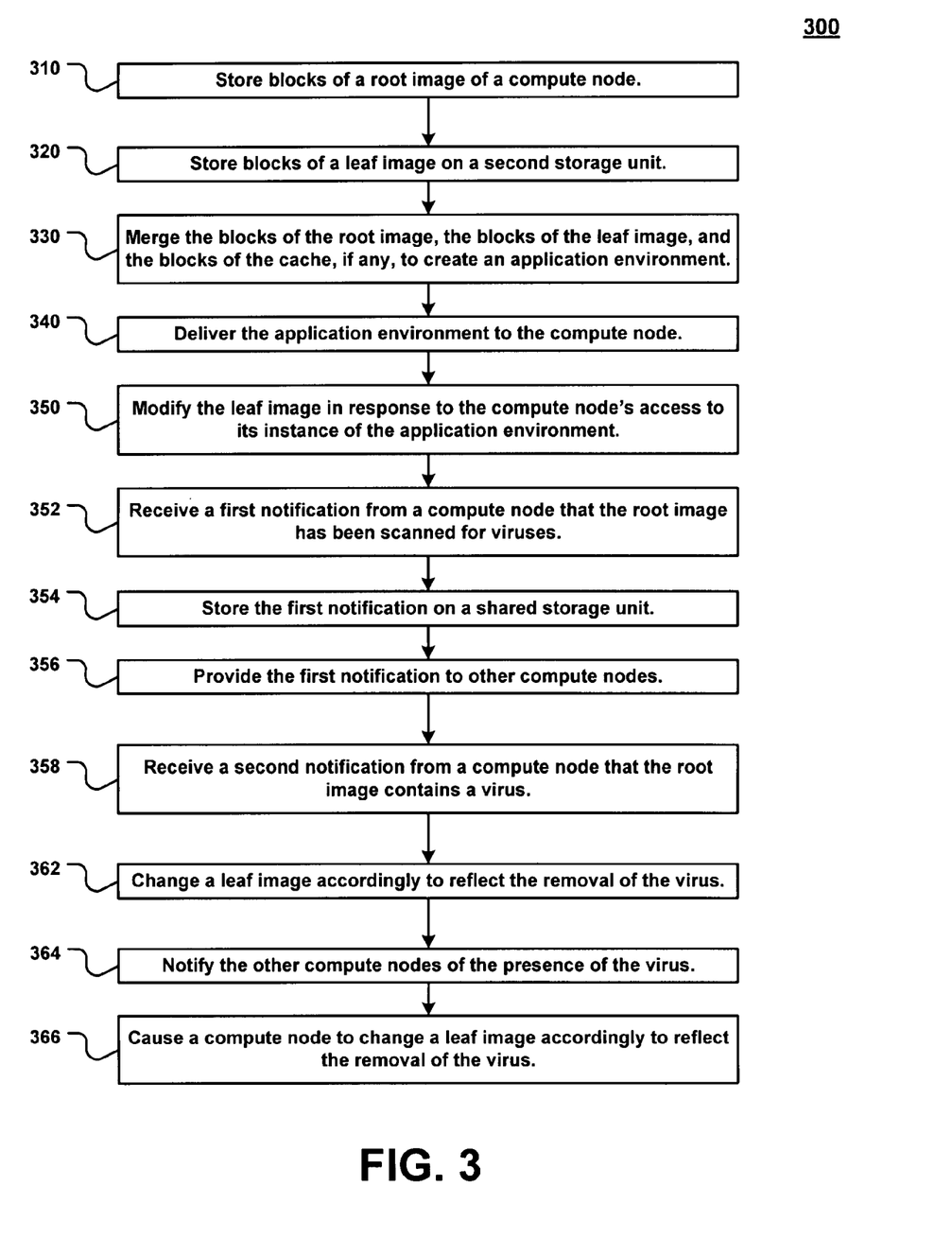
FIG. 3 is a flowchart illustrating a process for root image caching and indexing in a block-level distributed application environment, in accordance with various embodiments of the present invention.

FIG. 3 is a flowchart illustrating a process 300 for root image caching and indexing in a block-level distributed application environment, in accordance with various embodiments of the present invention. Although specific operations are disclosed in process 300, such operations are exemplary. Process 300 may not include all of the operations illustrated by FIG. 3. Also, process 300 may include various other operations and/or variations of the operations shown by FIG. 3. Likewise, the sequence of the operations of process 300 can be modified. Steps of process 300 may be stored as instructions on a computer readable medium and executed on a computer processor.

Step 310 involves storing blocks of a root image of the compute node on a first storage unit. By storing data at the block level, embodiments are able to operate beneath the file system and thus are designed to be file system and operating system independent.

Step 320 involves storing a leaf image on a second storage unit. The leaf image includes, but is not limited to, new data blocks for the compute node and blocks of the root image that the compute node has changed. The leaf image includes a block modification log in one embodiment.

Step 330 involves merging the blocks of the root image, the blocks of the leaf image, and the relevant blocks of the cache, if any, to create the application environment. In other words, the merging occurs at an operational level between the file system of a compute node and the first storage unit, the corresponding second storage unit, and the cache. Once the application environment has been created, it will appear to the compute node as one cohesive image rather than a base image plus its additions, deletions, and modifications. To the compute node, it appears that it has access to its own unique version of an application environment. However, a separate and complete boot image is not actually stored for the compute node.

Step 340 involves delivering the application environment to the compute node. Step 340 may comprise a low-level driver determining which data blocks are needed for the compute node's instance of the application environment and delivering the application environment to the compute via the compute node's file system.

Step 345 involves updating the cache based on the read request. For instance, to the extent that a compute node has accessed root image data not currently stored in the cache, the cache should be updated to include that cache. In some cases, the amount of data in the cache may approach a capacity limit, either due to the physical capacity of the cache itself or due to threshold limit set in software.

Step 350 involves modifying the leaf image in response to the compute node's access to its instance of the application environment. The modifying of the leaf image may include copying one or more data blocks from the root image to the leaf image, and modifying the data block in the leaf image. It will be appreciated that the data block being modified may already exist in the leaf image, in which case it does not need to be copied from the root image before modification.

Step 352 involves receiving a first notification from a compute node that the root image has been scanned for viruses. Step 356 involves providing the first notification to other compute nodes. It is appreciated that this may be done in a number of ways. For example, the first notification may be provided directly to the compute nodes. Alternatively, first notification may be stored on a shared storage unit (step 354) and then provided to the compute nodes via the shared storage unit. By receiving notification that the root image has been scanned one compute node and then providing it to the rest of the compute nodes, valuable time, resources, and bandwidth are saved for the other compute nodes. Since the root image is common to all the compute nodes, any re-scanning of the root image would be redundant and a waste of resources.

Step 358 involves receiving his second notification from a compute node that the root image contains a virus. The second notification may be provided in a manner similar to the first notification described above. Moreover, is appreciated that the first notification in the second notification may be provided together (i.e., in the same transmission, same file, etc.).

Step 362 involves changing one or more leaf images accordingly to reflect the removal of the virus found in step 358. Because the data of the root image in the leaf images are stored at the block level, and because the data of the root image does not change, a file is effectively "removed" by indicating such on the leaf images such that from the point of view of the compute nodes, the offending file has been removed.

Step 364 involves notifying the other compute nodes of the presence of virus found on the root image. Step 366 then involves causing one or more of the other compute nodes to a change their leaf images accordingly to reflect the removal of the virus.

Figure 4:
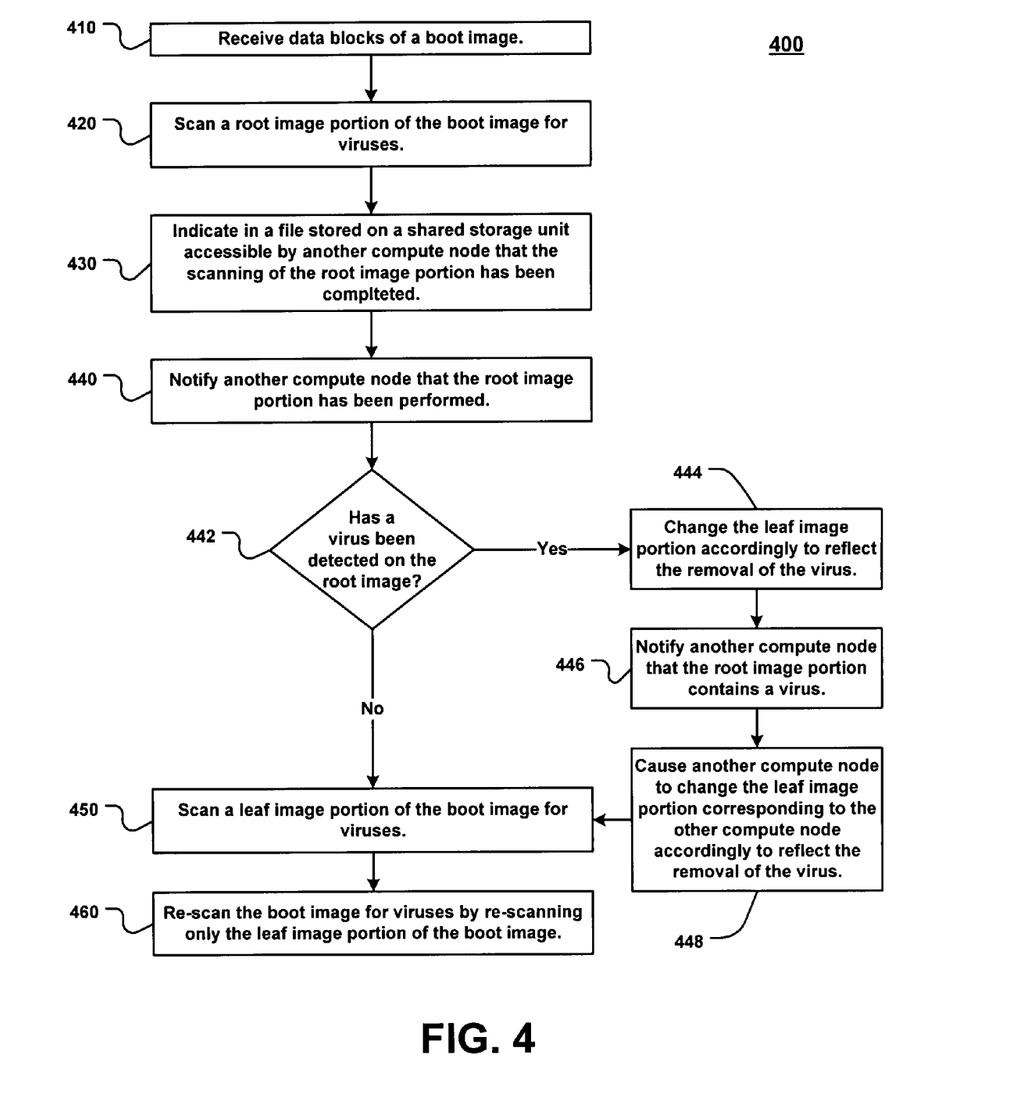
FIG. 4 illustrates a flowchart for a process for scanning a root image for viruses, in accordance with various embodiments of the present invention.

FIG. 4 illustrates a flowchart for a process 400 for scanning a root image for viruses, in accordance with various embodiments of the present invention. Although specific operations are disclosed in process 400, such operations are exemplary. Process 400 may not include all of the operations illustrated by FIG. 4. Also, process 400 may include various other operations and/or variations of the operations shown by FIG. 4. Likewise, the sequence of the operations of process 400 can be modified. Steps of process 400 may be stored as instructions on a computer readable medium and executed on a computer processor.

Step 410 involves receiving data blocks of a boot image at a compute node. The data blocks include a root image portion in the leaf image portion. As described above, the leaf image portion includes additional data blocks not previously contained in the root image portion and also changes made by the compute node to the blocks of the root image. Thus, the boot image actually seen by the compute node is a product of merging the root image portion in the leaf image portion together at the block level.

Step 420 involves the compute node scanning the root image portion of its boot image for viruses. In such a case, the compute node is to some extent cognizant of the fact that its boot image is divided between a root image portion and a leaf image portion. At step 440, the compute node notifies another compute node that the virus scan of the root image portion has been completed. It is appreciated that this may be achieved a number of ways. For example, the first compute node may simply notify the second compute node directly. Alternatively, the first compute node may indicate in a file stored on a shared storage unit that is accessible by the second compute node that the virus scan has been completed (step 430).

At step 442, a determination is made as to whether a virus has been detected on the root image. If a virus is not detected, FIG. 4 simply proceeds to step 450. If a virus is detected, FIG. 4 proceeds to step 444, where the compute node changes the leaf image portion accordingly to reflect the removal of the virus. Step 446 involves the compute node notifying another compute node that the root image portion contains a virus. It is appreciated that this may be done in a number of ways. For example, the first compute node may notify the second compute node directly. In another embodiment, the first compute node may indicate in the file stored on a shared storage device that a virus has been detected. At step 448, the compute node may also cause another compute node to change its corresponding leaf image accordingly to reflect the removal of the virus. It is appreciated this may also be done a number of ways. For example, the first compute node may issue a command directly to the second compute node, the first compute node may issue a command directly to the second compute node's corresponding UBD, the first compute node may store a special file on a shared storage device directing the second compute node to remove the file, etc.

Once the compute node has been scanned and cleaned (if necessary), the compute node may complete its scanning of its boot image for viruses by scanning the leaf image portion of the boot image (step 450). Further down the road, the benefits of scanning the root image separately from the leaf image are realized when the compute node requires that its boot image be re-scanned or when a different compute node requires that its boot image be scanned. For instance, at step 460, the compute node re-scans its boot image for viruses by only re-scanning its corresponding leaf image portion. Since the root image portion has already been scanned, and its contents do not change, it is therefore repetitive and unnecessary to perform a second scan of the root image.

Thus, by operating at the block level, embodiments of the present invention provide file system and operating system independent systems and methods for distributing an application environment to a compute node. By utilizing a branching store system of application environment distribution, embodiments of the present invention allow creation of boot images on the fly without significantly diminishing bring-up time. This is due to the fact that creating a new boot image does not require copying the contents of the root image, but rather it involves registering a new UBD with the system, which occurs very quickly.

Embodiments of the present invention also allow for scalability and redundancy. For example, a server containing the root image may only have the resources to supply the root image to 100 compute nodes. Thus, in order to implement a 200-compute node system, two servers, each containing a copy of the root image, are used. This scalability provided by embodiments also lends itself to dynamic scaling. In other words, the number of root images required for a specific configuration can change based on the I/O workload, and new root images can be created on the fly accordingly. Moreover, additional servers containing the root image may be added into the system to provide redundancy and increase reliability. For example, and with reference to FIG. 2, cache 261, first storage unit 241, and second storage units 251a-n provide failover/redundancy security for system 200. As an added security measure, some of the root nodes may be located remotely from each other (e.g., half located in a main office and half in a satellite office). In addition, it is possible to copy the contents of one or more leaf nodes into a non-UBD (regular block device) copy (e.g., for use as an isolated backup).

Moreover, because of the commonality of the root image and the fact that its contents are not directly changed, certain operations performed on the root image (e.g., virus scanning) only need to be performed once by one compute node. Thereafter, the results of that operation can be shared with the other compute nodes in the cluster, thus saving the other compute nodes valuable time and resources.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for virus scanning boot images for a plurality of compute nodes, comprising:
   a first storage unit for storing blocks of a root image of said compute nodes;
   a plurality of second storage units for storing leaf images of respective compute nodes, said leaf images only comprising:
      additional data blocks not previously contained in said root image; and
      changes made by respective compute nodes to the blocks of said root image; and
   a plurality of union block devices corresponding to said compute nodes, said union block devices for interfacing between said compute nodes and said first and second storage units to distribute said boot images to said compute nodes, wherein said union block devices create said boot images by merging the blocks of said root image stored on the first storage unit with the blocks of respective leaf images stored on respective second storage units, wherein said boot images each comprise portions of said root image and said blocks of respective leaf images for said respective compute nodes, and wherein further at least one of said union block devices is operable to allow a particular compute node to scan said root image for viruses and notify another of said compute nodes that said scanning of said root image has been performed.

2. The system as recited in claim 1 wherein said at least one of said union block devices is operable to modify a particular leaf image to reflect the removal of a virus found on said root image.

3. The system as recited in claim 1 wherein said first storage unit and said second storage units are contained within a single storage appliance.

4. The system as recited in claim 1 further comprising:
   a plurality of union block devices for interfacing between respective compute nodes and said first storage unit and respective second storage units, said union block devices operable to distribute application environments to the compute nodes, wherein said union block devices create said application environments by merging the blocks of said root image with the blocks of respective leaf images.

5. The system as recited in claim 4 wherein said union block devices comprise low-level drivers for interfacing between the file systems of respective compute nodes and said first storage unit, respective second storage units, and said cache.

6. The system as recited in claim 1 wherein said first storage unit is read-only.

7. A method for scanning boot images for a plurality of compute nodes, comprising:
   storing blocks of a root image of said compute nodes on a first storage unit;
   storing leaf images for respective compute nodes on respective second storage units, said leaf images only comprising:
      additional data blocks not previously contained in said root image; and
      changes made by respective compute nodes to the blocks of the root image;
   merging the blocks of said root image with the blocks of respective leaf images stored on respective second storage units to create respective file systems for respective compute nodes wherein said respective file systems each comprise portions of said root image and said blocks of respective leaf images for said respective compute nodes;
   receiving a first notification from one of said compute nodes that said root image has been scanned for viruses; and
   providing said first notification to the others of said compute nodes.

8. The method as recited in claim 7 further comprising: storing said first notification on a shared storage unit.

9. The method as recited in claim 7 wherein said merging occurs at an operational level between the respective file systems of the compute nodes and said first storage unit and respective second storage units.

10. The method as recited in claim 7 wherein said first storage unit is read-only.

11. The method as recited in claim 7 further comprising:
   receiving a second notification from one of said compute nodes that said root image contains a virus.

12. The method as recited in claim 11 further comprising: changing said leaf images accordingly to reflect the removal of said virus.

13. The method as recited in claim 11 further comprising: notifying the others of said compute nodes of the presence of said virus on said root image.

14. The method as recited in claim 11 further comprising: causing the compute nodes to change said leaf images accordingly to reflect the removal of said virus.

15. Logic encoded in one or more non-transitory computer readable media for execution by a first compute node, and when executed said logic operable to:
   receive data blocks of a boot image, said data blocks comprising a root image portion and leaf image portion, said leaf image portion only comprising:
      additional data blocks not previously contained in said root image portion; and
      changes made by said first compute node to the blocks of said root image, wherein said root image portion only comprises portions of the root image not contained in said leaf image portion, wherein said boot image is the result of merging said root image portion and said leaf image portion together at the block-level, and wherein said boot image comprises a portion of said root image and a leaf image for a corresponding compute node;
   scan said root image portion for viruses; and
   notify a second compute node that said scanning of said root image portion has been performed.

16. The logic as recited in claim 15 wherein said notifying further comprises:
   indicating in a file stored on a shared storage unit accessible by said second compute node that said scanning of said root image portion has been performed.

17. The logic as recited in claim 15 wherein said logic is further operable to:
   scan said leaf image portion for viruses.

18. The logic as recited in claim 17 wherein said logic is further operable to:
   re-scan said boot image for viruses by re-scanning only said leaf image portion.

19. The logic as recited in claim 15 wherein said root image portion is read-only.

20. The logic as recited in claim 15 wherein said logic is further operable to:
   detect a virus on said root image portion;
   change said leaf image portion accordingly to reflect the removal of said virus; and
   cause said second compute node to change a second leaf image portion corresponding to said second compute node to reflect the removal of said virus.

* * * * *